Dec. 25, 1962 K. EICKMANN 3,070,377
SEALING ARRANGEMENT BETWEEN RELATIVELY ROTATING PARTS IN
HYDRAULIC AND PNEUMATIC MOTORS, INTERNAL
COMBUSTION ENGINES AND THE LIKE
Filed Oct. 14, 1958 2 Sheets-Sheet 1

INVENTOR
KARL EICKMANN
BY

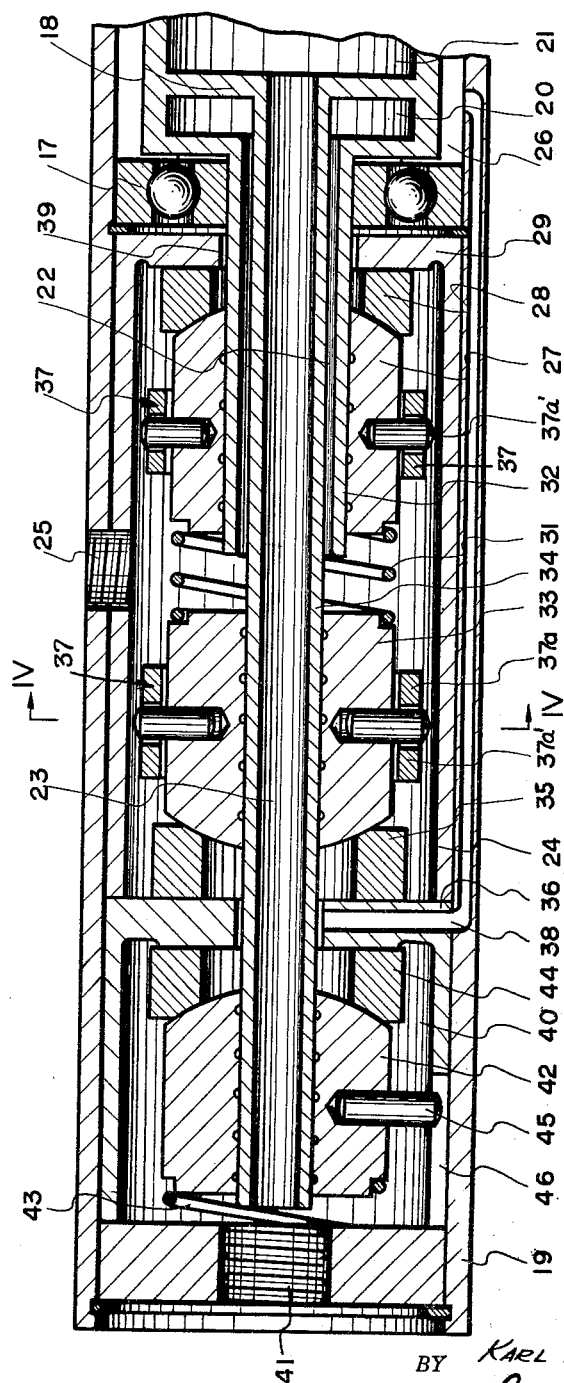

United States Patent Office 3,070,377
Patented Dec. 25, 1962

3,070,377
SEALING ARRANGEMENT BETWEEN RELA-
TIVELY ROTATING PARTS IN HYDRAULIC
AND PNEUMATIC MOTORS, INTERNAL
COMBUSTION ENGINES AND THE LIKE
Karl Eickmann, 2 Moeglinger Strasse,
Markgroeningen, Germany
Filed Oct. 14, 1958, Ser. No. 767,161
Claims priority, application Japan Oct. 19, 1957
1 Claim. (Cl. 277—74)

This invention relates to a sealing arrangement between relatively rotating parts in hydraulic and pneumatic machines, especially gas and liquid pumps, motors, internal combustion engines, and the like, and more specifically, it concerns with a sealing sleeve having a running fit and on its cylindrical inner surface a plurality of wavy lubricating grooves not communicating with one another and serving for sealing a rotatable part against a stationary part, in cooperation with a spherical recessed sealing ring provided with the corresponding cooperating sealing surface.

In gas or hydraulic machines, especially pumps or compressor motors, the pressure medium is often produced in the rotor or led into the rotor, and thence discharged into the stator, from which the medium is delivered through pipe lines. In other embodiments, however, the pressure medium is conveyed from the stators into the revolving parts.

During this passage of the medium from rotor to stator, or alternatively, from stator to rotor, useless loss of pressure medium must be naturally avoided. In the case of simpler modes of conventional construction, the necessary sealing is obtainable by using simple packings consisting of an elastic material, for instance, leather, rubber or synthetic materials. These packings are often tightly fit into a cylinder and kept in a sealing relation with the rotating parts by means of their sealing lips sliding thereon. These lips are tightly pressed on to the rotating members by the action of the medium, thus providing an effective seal between stationary and rotating parts.

This kind of sealing means, which have been commonly used, for instance, as shaft seals in motor cars and the like, are, however, effective only with lower pressures and lower revolutions of the machine. Should the rotational speed of the machine become higher, these lips of the packings will be heated and finally burnt, thus resulting at last in loss of sealing.

These shaft packings are only effective with lower pressures. When the medium pressure becomes higher in operation, the lips are pressed too strongly, so that the friction becomes so large, that the lips begin again to burn and finally lose their effective sealing action.

Further, the thus resulted large friction with above mentioned conventional shaft seals results in a lower overall efficiency of the machine, in which they are incorporated, this tendency makes it often impossible to employ these packings as shaft seal.

The above mentioned drawbacks of the conventional shaft seals can be completely overcome by the present invention. This invention makes it further possible to realize an effective seal between stationary and rotating machine parts without any appreciable power—and frictional losses, even when the medium pressure, for instance, oil pressure amounts to as high as 400 atmospheric pressures, thus resulting in the effective passage of the medium therebetween.

In a preferred embodiment of the present novel arrangement, the sealing effect between stationary and rotating machine elements is obtained in a purely metallic manner, on the one hand, but in another embodiment, the sealing is carried out in a purely metallic manner together with auxiliary elastic packing rings, on the other hand.

A sleeve, which encloses part of the rotating shaft with an appropriate fit, is suspended so freely in the machine space, that it may follow any possible irregular or uncentered movements, such as vibrations and the like, of the rotating parts. The sealing sleeve is acted upon by the medium pressure in the axial direction and thus pressed with its spherical opposite end against the corresponding surface provided on a ring at one end of the latter. This ring is provided with a plane end surface at its opposite end and in turn pressed against the cooperating plane surface of the stator. This ring has enough radial play, so that it may freely move on the plane surface of the stator. The ring is prevented from turning by pin means. The possibility of free movement both of spherical recessed ring and sealing sleeve relative to each other assures that the latter follows any possible vibration or other irregular movement of the rotating shaft. This arrangement allows further a highly limted play between sealing sleeve and shaft, thus providing an effective sealing therebetween. Wavy lubricating grooves are provided to lubricate effectively every cooperating part, which slide along each other. Any jamming of individual parts can be effectively avoided, because the sleeve may follow any unidirectional pressure load and thus brought into contact with the rotating shaft in no way, otherwise the contact would produce too high a surface pressure thereon. By this measure, any possible one-side and local wear can be avoided. The desired sealing effect between the plane surface of the spherical recessed ring and of the machine casing, on the one hand, and between the spherical surface of the said ring and the correspondingly shaped end of the said sleeve, on the other hand, can be effectively increased by the provision of ring packings therebetween, because there are always only slight relative movements at these engaging surfaces.

When the arrangement is such that the inner member rotates, the freely oscillatory sealing sleeve is so suspended that it can follow any irregular movement, such as oscillations, vibration and the like of the inner member, and vice versa.

When a plurality of flows of pressure medium are to be separately led from the rotating part to the stationary part, or alternatively, from the stationary part to the rotating part, a corresponding number of passages are provided in the shaft, and a number of sets, each comprising a sealing sleeve and spherical recessed ring are provided to seal the several outlets for the pressure medium.

The foregoing and other objects, advantages and special features of the invention will appear more fully hereinafter from a consideration of the detailed description which follows, taken together with the accompanying drawings wherein several embodiments of the invention are illustrated by way of example. It is to be expressly understood, however, that the drawings are for illustration purposes only, and are not to be construed as defining the limits of the invention.

In the drawings, wherein like reference numerals refer to like parts:

Figure 1:
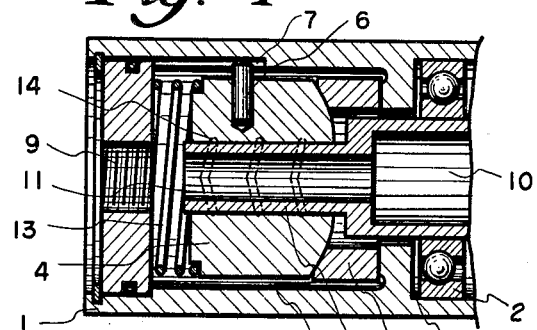
FIG. 1 shows a longitudinal section through a preferred embodiment of this invention, illustrating a sealing arrangement between rotor and stator in a gas or liquid rotary machine, in which the pressure medium is delivered from the rotor into the stator.

FIG. 3 is a longitudinal section through a third embodiment of this invention, illustrating a rotating member together with its attached sealing means of an oil pump having two chambers, from which the pressure medium is delivered, or alternatively into which the said medium is discharged, and in the form of two flows separated from each other, one of the latter, on the one hand, is sealed by means of a set of sealing arrangement shown in FIG. 1 and the other, on the other hand, is kept in a sealed condition by the help of two sets of those, each similar to that illustrated again in FIG. 1, wherein, however, two sleeves employed, are kept in a suspended condition and against rotation by pin means.

Figure 4:
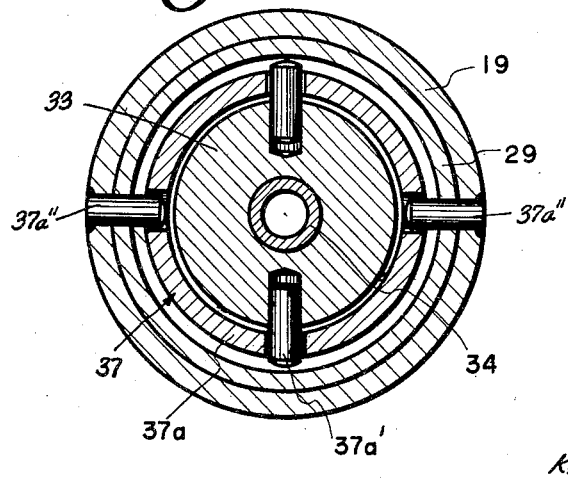

FIGURE 4 represents a cross-section taken on the line IV—IV in FIGURE 3.

Now, referring to FIGURE 1, the pressure medium, although not shown, fills the inner space of the rotor 3, which is mounted in a plurality of anti-friction bearings 2, of which only one is shown in the drawing. The medium flows from the rotor chamber 10 through the bore 11 of the rotor into a space 8 of the stator 1 and is thence discharged through a screw connection 9 to outside of the pump. Should none of sealing means be provided between the aforementioned space 8 and a machine chamber 12, the pressure medium would escape from the former into the latter. The sealing effect is obtained by the provision of a sealing sleeve 4, which encloses the rotor shaft with a proper fit, but is prevented from turning by means of a pin 6, which is kept in engagement with a groove 7 cut in the machine housing 1. The sealing sleeve 4 is, in addition, pressed by the medium pressure prevailing in the stator chamber 8 against the sealing surface on a spherical recessed ring 5, a tightly sealing contact between spherical cooperating surfaces on the said sleeve and ring being thus effectively provided. On account of this pressure engagement, the opposite plane end of the said ring 5 is also pressed against the plane surface of the stator or machine housing 1, providing thus an effective sealing therebetween. The sealing sleeve 4 is provided with a plurality of lubricating grooves 14 not communicating with one another, so that the relatively moving surfaces between rotor shaft and sealing sleeve can be effectively lubricated. Between the ring 5 and the plane housing wall is also established an effective sealing, because the cooperating plane surfaces thereon are kept in an effective sealing condition under pressure. Between rotor shaft 3 and sealing sleeve 4 is also established a reasonably good sealing, but it is not of the absolute one, because these parts are kept in a running fit condition, which, however, cannot naturally provide an absolute sealing. When vibrations, uncentered rotation or other erroneous movements occur in the running of rotor shaft 3, the sealing sleeve 4, which is supported only by pin 6, spring 13 and oil pressure prevailing in stator chamber 8, is kept in a floating condition and freely movable in engagement with the said ring 5, which is in turn radially movable on the plane surface of the housing 1, so that sleeve 4 is capable of effectively following any displacement of the axis of rotor 3.

Figure 2:
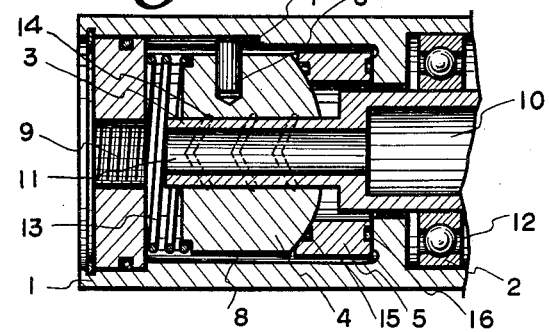
FIG. 2 represents a longitudinal section through a second embodiment of the invention, representing a sealing arrangement between rotor and stator in a similar machine, in which the pressure medium is discharged from the rotor into the stator, the spherical recessed ring being, however, provided with elastic ring packings in order to further increase its sealing effect.

In the second embodiment of this invention shown in FIGURE 2, the sealing effect between the spherical surface on sealing sleeve 4 and the cooperating surface on the said ring 5, as well as the same effect between the latter and the housing 1 at their cooperating plane surfaces, is further increased by the additional provision of elastic packing rings 15 and 16.

The ring packing 15 is so inserted in a groove, that it contacts both sleeve 4 and ring 5. In the similar way, the ring packing 16 is so introduced in a groove, that it engages ring 5 and the plane surface of casing 1. The pretension of ring packing 15, which may be further increased by the influence of the oil pressure prevailing in the stator chamber 8, serves for sealing the ring 5 against the sleeve 4. In the similar way, the compression of ring packing 16, which may be further increased by the oil pressure from the chamber 8, provides an effective seal between ring 5 and the plane wall surface of casing 1.

In the third embodiment of the invention shown in FIGURE 3, illustrating a part of an oil pump having a rotor 18, which provides two flows of the pressure medium, three sets of sealing means are arranged to prevent them from communicating to each other. The rotor 18 is supported by anti-friction bearings 17, of which only one is shown, and rotates within the stator housing 19. There are two pressure chambers 20 and 21 in the rotor 18, said chambers containing the pressure medium and being kept separated from each other without any communication therebetween. The medium flows from the rotor chamber 20 through a passage 22 into a stator chamber 24 and is thence discharged through a screw connection 25 to outside of the machine. The sealing between stator chamber 24 and stator casing chamber or space 26 is realized by that a sealing sleeve 27 is pressed at its spherical end surface against the cooperating receiving spherical surface of ring 28 under the influence of spring action 34 and the oil pressure prevailing in the stator chamber 24, the said ring 28 being in turn pressed thereby against the plane cooperating surface on a casing liner or partition 29. In this way, sleeve 27, ring 28 and liner or partition 29 are pressed in a tight sealing condition one after another. An outer rotor tube 32 rotates within the sealing ring 27 with a running fit, thus providing an effective seal between rotor 18 and sleeve 27.

The stator chamber 24 is effectively sealed in the opposite direction by means of a sealing sleeve 33, which encloses part of the rotor tube 34 in a sealed relation. The spring 31 and the medium pressure prevailing in the stator chamber 24 urges the sleeve 33 to be pressed at its spherical backside against the coacting receiving surface on a spherical recessed ring 35, which is in turn pressed at its plane back end against the cooperating plane surface on the casing liner or partition 36. The sealing sleeve 33 provides an effective sealing between itself and the rotor tube 34 with an accurately finished running fit, which sleeve 33, ring 35 and liner or partition 36 are pressed under pressure one after another and thus sealed effectively. The sealing sleeve 27 is prevented from turning by a pin means 37a'. In the similar way, the sleeve 33 is suspended by a universal like suspension pin means 37a', including inner pins 37a' and outer pins 37a" respectively extending outwardly from the sleeve 33 to a ring 37 and inwardly from the stator housing 19 to this same ring 37, FIG. 4. It would be clearly understood, that these sleeves 27 and 33 can effectively follow any possible uncentered rotation of outer and inner rotor tubes 32 and 34. The leakage oil flows through passages 38 and 39 into an oil collecting chamber 26 of the machine casing 19.

From the pressure chamber 21 of the rotor 18 flows the pressure medium through passage 23 the rotor tube 34 into a stator chamber 40, and can thence be discharged through a screw connection 41. The sealing of the stator chamber 40 against the leakage oil passage is provided by a sealing sleeve 42, which is pressed at its spherical back end against the cooperating receiving surface on a spherical recessed ring 44 under the influence of a spring tension 43, as well as of the medium pressure prevailing in the stator chamber 40, the said ring being in turn pressed against the plane wall of the casing partition 36. The sleeve is also prevented from turning by a pin 45, which engages in a groove 46. The accurately machined running fit between rotor tube 34 and sealing sleeve 42 provides an effective sealing therebetween. Sleeve 42, ring 44 and liner or partition 36 are thus pressed against one after another, so that they are sealed successfully under pressure. The sealing sleeve 42 is thus able to follow any possible erroneous or uncentered rotation of the rotor tube 34.

From the foregoing it will be obvious that the principles of the invention may be carried into effect by means of a wide variety of specific structural embodiments, that various features may be combined in different ways and that certain features may be employed to the exclusion of others. The invention is accordingly to understand as embracing all forms of apparatus falling within the scope of the appended claim.

Having thus described the invention, what is claimed as new and desired to be secured by Letters Patent is:

A sealing arrangement comprising a stator housing, a rotor journalled in said stator for rotation therein, said rotor having two separate pressure chambers, said stator housing having two closed chambers axially-spaced from said rotor one outwardly beyond the other and separated from one another and from space surrounding the rotor by partitions axially-spaced from the rotor, outer and inner tubes respectively extending axially from the respective pressure chambers of the rotor and respectively to the respective axially-spaced stator chambers, a first sealing sleeve surrounding the outer tube and in running fit engagement therewith, a ring surrounding the outer tube and having sealing engagement with the partition adjacent to said space surrounding the rotor and having a spherical surface, said sealing sleeve having a spherical end surface cooperating with the spherical surface of said ring to have sealing engagement therewith, a second sleeve with a spherical surface thereon having running fit engagement with the inner rotor tube, a ring surrounding said inner tube and in sealing engagement with the other partition and having a spherical surface in sealing engagement with a spherical surface of the second sleeve, spring means interposed between the two sleeves and acting in cooperation with the fluid pressure from said rotor within the one stator chamber to maintain the respective sleeves and rings against their respective partitions, a third sleeve within the other stator chamber and having a running fit upon the inner rotor tube extended thereinto, said latter sleeve having a spherical surface, a ring having sealing engagement with the other partition on the opposite side thereof and a spherical surface in sealing engagement with the spherical surface of said latter sleeve, spring means operable in cooperation with the fluid pressure from said rotor for maintaining the sleeve and ring in said other stator chamber in sealing engagement with one another and with the opposite side partition, and anti-rotation means reacting between the sleeves and the stator extension to retain the sleeves against rotation within their chambers but permitting slight universal-like motion of the sleeves to accommodate themselves to any uncentered rotation of rotor tubes.

References Cited in the file of this patent

UNITED STATES PATENTS

| | | |
|---|---|---|
| 515,227 | Hudders | Feb. 20, 1894 |
| 846,283 | Cook | Mar. 5, 1907 |
| 2,037,144 | Olson | Apr. 14, 1936 |
| 2,628,112 | Hebard | Feb. 10, 1953 |
| 2,963,306 | Tracy | Dec. 6, 1960 |
| 2,978,264 | Campbell | Apr. 4, 1961 |

FOREIGN PATENTS

| | | |
|---|---|---|
| 733,959 | Germany | Apr. 6, 1943 |